July 22, 1941.    A. E. FLYNN    2,250,365
APPARATUS FOR THE SEPARATION OF MINERALS
Filed Aug. 14, 1939
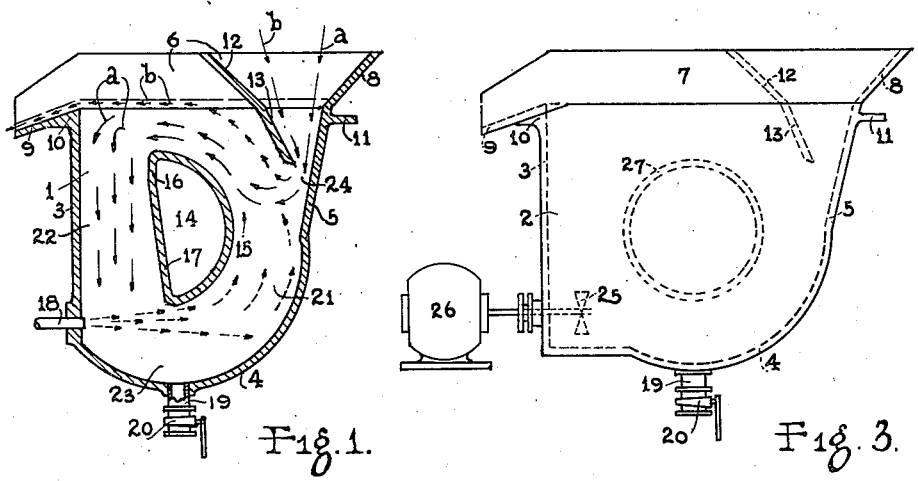
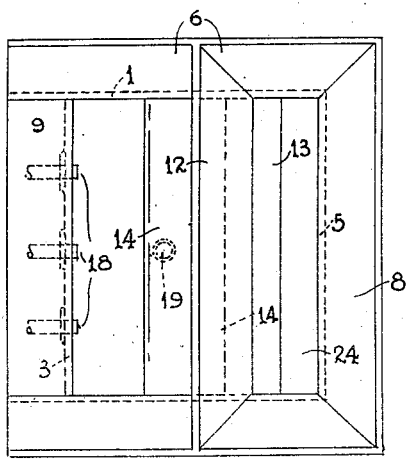
Fig. 2.
Arthur Edward Flynn
*Inventor*
by
*Attorney*

Patented July 22, 1941

2,250,365

UNITED STATES PATENT OFFICE 2,250,365

APPARATUS FOR THE SEPARATION OF MINERALS

Arthur Edward Flynn, Halifax, Nova Scotia, Canada

Application August 14, 1939, Serial No. 289,960
In Canada September 23, 1938

1 Claim. (Cl. 209—155)

This invention relates to methods of and apparatus for the separation or classification of mineral ores or like materials.

Many devices have been proposed for this purpose, such as hydraulic traps, mercury traps, amalgam and gold traps and it is the object of the invention to provide an improved method and apparatus of this general type.

One type of trap at present used consists of a single pocket, in the form of an inverted cone, with or without a vertical stream of water impinging on the material to be classified in the apex of the cone.

According to the invention a fluid body is circulated about a horizontal axis in a container, the material to be classified, consisting of pieces or particles of various weights, is fed into said fluid body at the ascending side thereof, the heavier particles settle in the descending portion of the fluid body, while the lighter particles float out of the container adjacent the top thereof.

The trap has at least two compartments or zones having distinct and separate functions in the recovery process, and may be activated by a horizontal or inclined jet of water that maintains an open and active bed of material to catch the valuable particles that settle in the trap, and also positively and continuously circulates the mass of material or pulp through the zones so that any valuable mineral that is not immediately recovered is treated repeatedly, thereby assuring more efficient recoveries.

The invention consists in the construction and operations hereinafter described and more particularly pointed out in the appended claim.

Referring now to the accompanying drawing, which illustrates, by way of example, certain convenient embodiments of the invention, Figure 1 is a vertical cross sectional elevation, Figure 2 is a plan view of Figure 1 and Figure 3 is a sectional elevation similar to Figure 1, but illustrating certain modifications.

The improved apparatus comprises a casing or trap which in the form shown comprises side walls 1 and 2, a vertical front wall 3, an arcuate bottom wall 4, and a rear wall formed by a sloping part 5 and an upper extension of the bottom wall 4. The top of the casing may be open, and upwardly diverging flanges 6, 7 and 8 may conveniently be provided at the top of the walls 1, 2 and 5 respectively. A suitable overflow lip 9 is provided at the top of the front wall 3, the sloping flanges 7 and 8 being preferably continued down the sides of this lip to prevent escape of the overflow laterally. Any convenient supporting means may be provided for the apparatus, a support 10 and bracket 11 being indicated for this purpose.

Any convenient form of feed hopper is provided, that shown in the drawing being formed integrally with the casing. The hopper illustrated is formed partly by the upper parts of walls 1, 2 and 5 and their flanges 6, 7 and 8 and partly by a partition having an upper inclined portion 12 and a lower portion 13 of steeper inclination. The partition 12, 13 extends entirely across the casing and may be formed integrally with the side walls of the casing, as indicated in Figure 2.

A centre core or baffle 14 is provided within the casing, and is preferably hollow and extends entirely across the space between the side walls 1 and 2, and may be integral therewith if so desired. As shown in Figures 1 and 2, the baffle 14 is substantially D-shaped in cross-section, the curve 15 of the D being almost concentric with the curvature of the bottom wall 4, and the other part of the D comprising a short flat upper part 16 converging downwardly towards the front wall 3 and a lower flat part 17 which diverges downwardly away from wall 3.

A nozzle 18, connected to a source of water under pressure, not shown, enters the casing adjacent the bottom of the wall 3, and is so arranged as to direct a flow of water at a suitable pressure through the space between the bottom of baffle 14 and the bottom wall 4.

At the lowermost point of the casing an outlet pipe 19 is provided and this outlet is preferably furnished with a spigot 20 to control the discharge from the casing.

The interior space of the casing may conveniently be regarded as comprising three principal zones, namely a sorting zone 21 at the right of the baffle 14, a settling zone 22 at the left of the baffle and a collecting zone 23 at the lower part of the casing below the jet from the nozzle 18.

More than one nozzle 18 may be provided if desired the number of nozzles depending on the width of the apparatus between the walls 1 and 2. Three parallel nozzles are shown, by way of example in Figure 2.

The material to be classified or sorted is fed into the hopper as indicated diagrammatically by arrows, the larger arrows $a$ and smaller arrows $b$ indicating the heavier and lighter particles respectively. The mixed particles enter the sorting zone 21 of the casing through a constriction 24. Here the particles meet an upwardly travelling current of water from the nozzle or nozzles 18, the course of the water current being indicated approximately by dotted arrows c. The particles are carried upwardly and towards the discharge lip 9 by the current of water, and while thus travelling they separate by surface-current classifying action, the heavier and more valuable particles sinking into the settling zone 22, while the lighter waste particles flow out of the casing over the lip 9 and are disposed of in any suitable manner.

The heavier material settles down through the zone 22, and passes through the jet from the nozzle 18 into the zone 23 where it collects and from whence it is discharged either continuously or at convenient intervals, through the discharge pipe 19.

Any unseparated particles which may pass down through the zone 22 are entrained by the jet from nozzle 18 and are caused to pass again around the baffle 14, until separation is completed.

Instead of, or in addition to, circulating the pulp by means of a water jet, this action may be effected, or assisted, by means of a mechanical impeller as indicated at 25 in Figure 3, the impeller being driven for example by an electric motor 26. Moreover, the cross-section of the baffle 14, instead of being D-shaped, may be circular as shown at 27 or any other suitable shape.

Some of the advantages of the improved trap are that it is non-choking and there are no dead areas, on account of the continuous circulation of the whole mass of material in the trap; it will not flush itself out from a surge of feed material or excess of water; its action is not hindered by an accumulation of tramp iron, such as nails or nuts such as is often found in a clean-up material fed into a classifier; all parts are readily accessible and easily cleaned out; it uses less water than other traps; it can be used as an amalgamator of gold ores; when used for the recovery of mercury and amalgam it cleans sickened mercury by the washing and scouring action of the moving sand particles and by rubring against the sides of the trap; and further the recirculation of material gives repeated treatment and more efficient recovery of valuable mineral.

It will be understood that the foregoing description and accompanying drawing are given by way of example only and that further modifications within the scope of the appended claim may be resorted to without departing from the spirit of the invention.

What I claim is:

In apparatus for the separation and classification of minerals or the like comprising a vessel having an arcuate bottom, side walls, one of which is slanted outwardly from a vertical position, another of which has an overflow lip extending outwardly from the top thereof, a centrally disposed substantially D shaped member, the curved portion of which is concentric with the arcuate bottom of the vessel, said D shaped member divides the vessel into three zones, water supply pipes situated at the bottom of the side wall to which the overflow lip is attached and by means of which water is discharged into the vessel and by the configuration of the said D shaped member caused to assume a rotary motion about said member, a feed hopper formed by three of the side walls other than the one to which the overflow lip is attached and an inwardly situated downwardly extending partition, whereby the material to be separated is fed below the liquid level of said vessel and in opposite direction to the flow of said liquid stream, causing the heavier particles to sink to the bottom of said vessel, the lighter particles to be moved transversely across the vessel, part thereof flowing out over the overflow lip, the remaining coarser material being carried to the bottom of the vessel wherein there is located discharge means for discharging said heavier material.

A. E. FLYNN.